(No Model.)

S. N. RAPP.
LATHE TOOL FOR TURNING AND FINISHING GAS FITTINGS, &c.

No. 512,564. Patented Jan. 9, 1894.

WITNESSES:
William Goebel.
C. Sedgwick

INVENTOR
S. N. Rapp
BY
Munn & Co
ATTORNEYS.

UNITED STATES PATENT OFFICE.

SAMUEL N. RAPP, OF TOLEDO, OHIO.

LATHE-TOOL FOR TURNING AND FINISHING GAS-FITTINGS, &c.

SPECIFICATION forming part of Letters Patent No. 512,564, dated January 9, 1894.

Application filed August 23, 1893. Serial No. 483,855. (No model.)

*To all whom it may concern:*

Be it known that I, SAMUEL NOYES RAPP, of Toledo, in the county of Lucas and State of Ohio, have invented a new and Improved Lathe-Tool for Turning and Finishing Gas-Fittings, &c., of which the following is a full, clear, and exact description.

The object of the invention is to provide a new and improved lathe tool, which is simple and durable in construction, and more especially designed to quickly and accurately turn and finish gas keys, cocks, valve plugs, &c.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1:
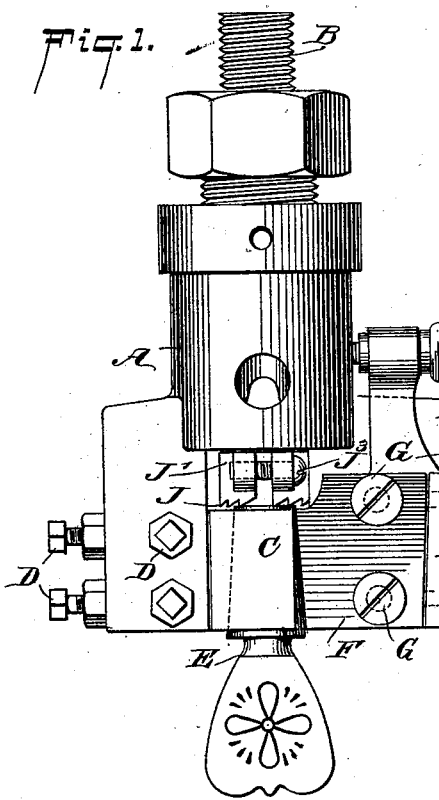
Figure 2:
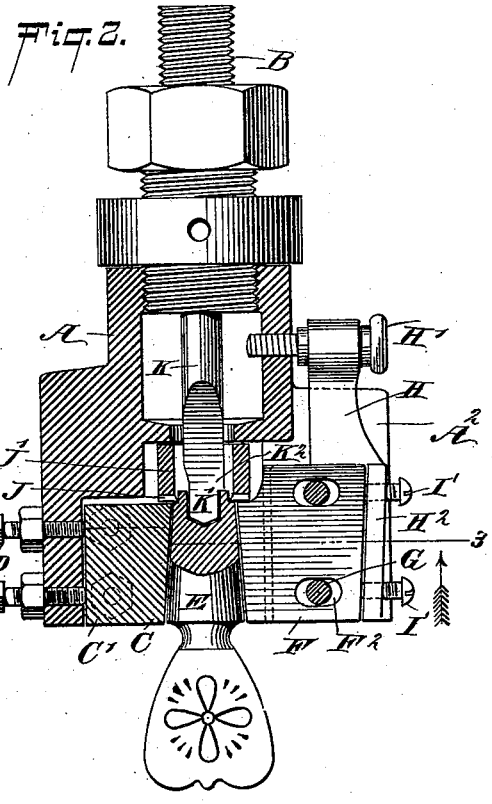
Figure 3:
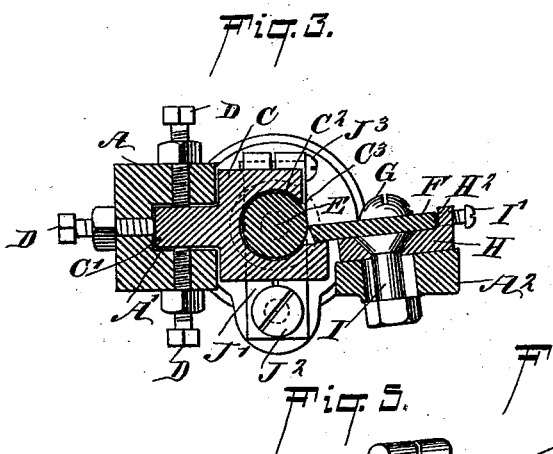
Figure 4:
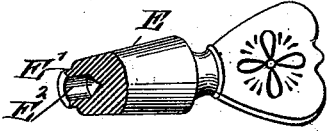
Figure 7:
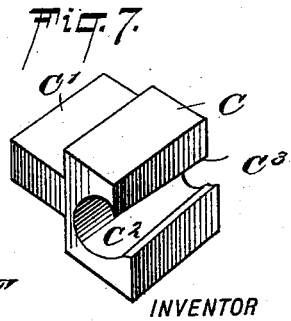
Figures 5, 6:
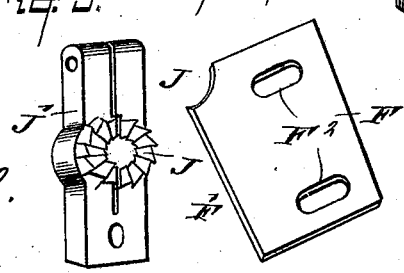

Figure 1 is a plan view of the improvement. Fig. 2 is a sectional plan view of the same. Fig. 3 is a cross section of the same on the line 3—3 of Fig. 2. Fig. 4 is a perspective view of one of the finished gas keys with part in section. Fig. 5 is a perspective view of the milling tool. Fig. 6 is a perspective view of the finishing tool; and Fig. 7 is a like view of the plug holder.

The improved lathe tool is provided with a body A, in one end of which enters a screw B, adapted to screw into the lathe spindle or chuck so that the lathe tool turns when the latter is set in motion.

In the front end of the body A is arranged a plug holder C, formed with a tongue C' fitting into a recess A' formed in one side of the body A, as plainly illustrated in Figs. 2 and 3. The tongue C' is held securely in place in the recess A' by a series of set screws D, screwing into the sides and end of the body A, as shown.

The holder C is formed with a tapering seat C², adapted to receive the plug, key or cock to be turned and finished, the said holder being also provided with a slot C³ leading into one side of the seat C². See Fig. 7. Into this slot C³ extends the cutting edge F' of a cutting tool F, formed with elongated slots F² engaged by set screws G, screwing in one side of the tool holder H, to fasten the said cutting tool F in place thereon.

The cutting tool holder H is mounted to turn on a stud I, held in a projection A² forming part of the body A. The inner end of the said cutting tool holder H carries a screw H', screwing into one side of the body A so as to impart a rocking motion to the holder H to adjust the cutting edge F' relative to the face of the plug E to be turned and finished. On the holder H is formed a flange H² in which screw the set screws I' engaging the back edge of the cutting tool F so as to adjust the same laterally at the time the set screws G are loosened to adjust the cutting edge F' relative to the face of the plug to be turned.

In order to form and finish the shoulder E' on the end of the plug E, I provide a milling tool J shown in detail in Fig. 5, and formed on a bar J' having a split end and secured at its solid end by a set screw J² to the body A. See Fig. 3. In the split end of the bar J' screws a set screw J³ to tighten the circular inner cutting edge of the milling tool J to a greater or less degree according to the size of the shoulder E' to be formed on the plug E. In the screw B and within the body A is secured a drill K having its cutting end K' made with a V-shaped point to enter the recess E² formed in the small end of the plug E. The said drill K also passes centrally through the milling tool J, as will be readily understood by reference to Fig. 2. On the said drill K at the cutting end K' is arranged a shoulder K² to face the top of the shoulder E'.

The operation is as follows: When the several parts are in the position illustrated in Figs. 1, 2 and 3, and the body A has been fastened on the lathe spindle and motion is given to the latter, then the operator passes the rough plug into the seat C² of the plug holder C, whereby the face of the said plug E is engaged and turned by the cutting edge F' of the cutting tool F, and at the same time, the milling tool J cuts the shoulder E' on the small end of the plug and the drill K forms the recess E² and at the same time faces the top of the shoulder E'. It is understood that the plug E is held stationary by a wrench or other suitable tool while the body A revolves with the lathe spindle. It will further be seen that the device is very simple and durable in construction, the several parts can be readily adjusted so as to bring the holder C with its seat C² into proper alignment with the drill K' and milling tool J, and the cutting tool F is likewise made adjustable as described to give the proper taper to the plug to be turned and finished. It will also be evident that by the use of this tool, keys or pegs of any length may be turned, faced, drilled and countersunk, in a rapid, accurate and efficient manner.

Having thus fully described my invention, I claim as new and desire to secure by Letters Patent—

1. In a lathe tool, the combination with a body having a recess in one side, of a plug holder having a tapering seat and a slot leading thereto, and provided with a tongue fitting in the recess of the body, and means for securing the plug holder in the body, substantially as described.

2. In a lathe tool, the combination with the body, and a holder carried by the body and provided with a plug seat and a slot leading to the seat, of a pivoted tool holder, means for rocking the tool holder, and a cutting tool adjustably secured to the tool holder, substantially as described.

3. In a lathe tool, the combination with a plug holder, of a milling tool at the inner end of the holder and comprising a bar having a slit end and a circular cutting surface, and means for drawing the members of the split end together, substantially as and for the purpose set forth.

4. A lathe tool, comprising a plug holder having a seat and a slot leading to the seat, a cutting tool extending through the slot into the seat, a milling tool at the inner end of the seat having an aperture and a circular cutting surface around said aperture and a drill projecting through the milling tool and having a shoulder at its cutting end for facing the end of the plug, substantially as herein shown and described.

5. A lathe tool comprising a revoluble body, a holder held adjustably therein and having a seat for the plug and formed with a slot leading to the seat, a tool holder held adjustably on the said body, a facing tool held adjustably on the said tool holder and extending with its cutting edge into the slot of the plug holder, a milling tool secured to the said body and extending with its cutting edge concentrically to the small end of the said seat, and a drill revolving with the said body and formed at its cutting end with a shoulder for facing the top of the shoulder on the plug, formed by the said milling tool, substantially as shown and described.

SAMUEL N. RAPP.

Witnesses:
HERMANN A. PRINZ,
C. H. F. LEMBKE.